UNITED STATES PATENT OFFICE.

THOMAS ALFRED ABBOTT, OF LOWELL, MASSACHUSETTS, ASSIGNOR TO THE NATIONAL PLASTER COMPANY, OF SAME PLACE.

PLASTER.

SPECIFICATION forming part of Letters Patent No. 315,691, dated April 14, 1885.

Application filed October 10, 1884. (No specimens.)

*To all whom it may concern:*

Be it known that I, THOMAS ALFRED ABBOTT, of Lowell, in the county of Middlesex, of the Commonwealth of Massachusetts, have invented a new and useful Improvement in Plasters for the Skin; and I do hereby declare the same to be described in the following specification.

My improved plaster, hereinafter explained, is composed of menthol and a base adhesive to the skin of a person when applied thereto. In such base I generally, if not always, use in a plastic state a quantity of caoutchouc as a constituent.

In making the composition, of which menthol is one part thereof, I take fifteen parts, by weight, of olibanum; fifteen parts, by weight, of Burgundy pitch; fifteen parts, by weight, of resin or rosin; fifteen parts, by weight, of orris-root, in powder; eight parts, by weight, of wax, as beeswax, for instance; thirty parts, by weight, of caoutchouc, and two parts, by weight, of menthol. These constituents are to be placed in a suitable kettle or vessel, to which heat is to be applied to melt such of them as can be rendered fluid thereby. While they are being melted, or are fluid, the mass is to be thoroughly stirred, after which it is to be spread by suitable means upon cloth or other material, so as to form therewith a plaster or plasters for application to the skin of a person for the cure or alleviation of pain or disease.

I do not confine the composition to the precise proportions of its parts as stated, as such may be varied somewhat without materially affecting it for the purpose for which it is designed; nor do I claim the mode described of treating it by heat for rendering fluid the portions of it capable of being melted by heat, as any other suitable means therefor may be adopted.

I claim—

The improved medicinal plaster herein described, consisting of menthol combined with the customary ingredients of adhesive plasters herein described in about the proportions specified, and spread upon a suitable foundation, substantially as set forth.

THOMAS ALFRED ABBOTT.

Witnesses:
R. H. EDDY,
E. B. PRATT.